US012650204B2

(12) United States Patent
Revidat et al.

(10) Patent No.: US 12,650,204 B2
(45) Date of Patent: Jun. 9, 2026

(54) HYDROGEN TANK AND METHOD FOR OPERATING A HYDROGEN TANK

(71) Applicants: Hyundai Motor Company, Seoul (KR); Kia Corporation, Seoul (KR)

(72) Inventors: Stephan Revidat, Langen (DE); Carsten Loevenich, Oberstenfeld (DE); Sebastian Martin, Fulda (DE); Yannick Port, Limeshain (DE); Ulrich Karrer, Mainz (DE); Andreas Kapp, Eschborn (DE)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 601 days.

(21) Appl. No.: 18/076,216

(22) Filed: Dec. 6, 2022

(65) Prior Publication Data

US 2024/0117934 A1 Apr. 11, 2024

(30) Foreign Application Priority Data

Oct. 10, 2022 (DE) .......................... 10-2022-210662

(51) Int. Cl.
*F17C 1/16* (2006.01)
*F17C 5/02* (2006.01)
*F17C 7/02* (2006.01)

(52) U.S. Cl.
CPC .................. *F17C 1/16* (2013.01); *F17C 5/02* (2013.01); *F17C 7/02* (2013.01); *F17C 2201/0109* (2013.01); *F17C 2201/0185* (2013.01); *F17C 2203/0604* (2013.01); *F17C 2203/0619* (2013.01); *F17C 2203/066* (2013.01); *F17C 2221/03* (2013.01); *F17C 2223/0184* (2013.01);
(Continued)

(58) Field of Classification Search
CPC ...... F17C 1/16; F17C 5/02; F17C 7/02; F17C 2201/0185; F17C 13/001; F17C 2221/012; F17C 2221/013; F17C 2221/03
See application file for complete search history.

(56) References Cited

U.S. PATENT DOCUMENTS 4,591,365 A 5/1986 Burr
12,043,874 B2 * 7/2024 Karuppaiah .......... C25B 15/081
(Continued)

OTHER PUBLICATIONS

Ballhom M., "Development of polymer Membranes for the Separation of Carbon Dioxide from Gas Streams" Dissertation, RWTH Aachen University, 2000.
(Continued)

*Primary Examiner* — Frantz F Jules
*Assistant Examiner* — Webeshet Mengesha
(74) *Attorney, Agent, or Firm* — Fox Rothschild LLP

(57) ABSTRACT

Disclosed are a hydrogen tank and a method of operating the same. The hydrogen tank includes a tank vessel configured with an enclosed interior space for storing an admixture of carbon dioxide and gaseous hydrogen; and a tank port configured to fluidly contact the interior space of the tank vessel and including a semipermeable membrane, which is configured substantially permeable for the gaseous hydrogen and substantially impermeable for the carbon dioxide and is arranged to seal the tank vessel against the outside. The gaseous hydrogen can enter and leave the tank vessel through the tank port via the semipermeable membrane but carbon dioxide is kept in the tank vessel.

15 Claims, 3 Drawing Sheets

(52) U.S. Cl.
CPC .............................. *F17C 2223/036* (2013.01); *F17C 2270/0178* (2013.01); *F17C 2270/0184* (2013.01)

(56) References Cited

U.S. PATENT DOCUMENTS

| | | | | |
|---|---|---|---|---|
| 2008/0044325 | A1* | 2/2008 | Radhakrishnan | ...... B01J 8/0278 422/187 |
| 2021/0283550 | A1* | 9/2021 | Kurishita | ........... C08G 18/6229 |
| 2022/0064805 | A1* | 3/2022 | Karimi | ........... C12Y 102/01009 |
| 2022/0177984 | A1* | 6/2022 | Karuppaiah | ............ C21B 7/002 |

OTHER PUBLICATIONS

International Journal of Hydrogen Energy, vol. 43, Issue 12, Mar. 22, 2018, pp. 6177-6190, "Hydrogen Production with Integrated CO2 Capture in a Membrane Assisted Gas Switching Reforming Reactor: Proof of Concept".

* cited by examiner

HYDROGEN TANK AND METHOD FOR OPERATING A HYDROGEN TANK

CROSS-REFERENCE TO RELATED APPLICATION

This application claims, under 35 U.S.C. § 119(a), the benefit of priority from German Patent Application No. 102022210662.8 filed on Oct. 10, 2022, the entire contents of which are incorporated herein by reference.

TECHNICAL FIELD

The present invention pertains to a hydrogen tank and a method for operating a hydrogen tank. The hydrogen tank may be used for a hydrogen-powered vehicle like a motor vehicle. The invention further pertains to a hydrogen vehicle, in particular a motor vehicle, having such a hydrogen tank.

BACKGROUND

Because of a combination of factors, such as environmental concerns, high oil prices and reduced availability of crude oil, development of cleaner alternative fuels and advanced power systems for vehicles has become a high priority for many governments and vehicle manufacturers around the world. Various solutions for vehicles running on alternative fuels have thus been increasingly contemplated in recent years. One particular example in this respect are hydrogen vehicles, which use hydrogen fuel for motive power. Such vehicles typically convert the chemical energy of hydrogen to mechanical energy either by burning hydrogen in an internal combustion engine or by reacting hydrogen with oxygen in a fuel cell to power electric motors.

Hydrogen is of increasing interest as an energy storage medium due to its favorable gravimetric energy content. In a wide range of industrial applications, hydrogen is stored in pressure tanks. In particular, in transportation, where space is scarce and the relatively low specific volumetric energy content of hydrogen may be an issue, hydrogen is often stored as a highly compressed gas (so-called compressed hydrogen).

Nowadays, so-called type IV pressure tanks have been usually used for hydrogen powered motor vehicles. These tanks have a composite construction featuring a polymer liner (typically high-density polyethylene) wrapped on the outside with a carbon fiber or hybrid carbon/glass fiber composite. The composite materials carry all of the structural loads while the liner serves as a gas diffusion barrier to keep the hydrogen from escaping through the vessel walls.

One basic prerequisite for this type of pressure tank usually is that the inner pressure should not fall below a certain minimal pressure threshold in order to prevent structural defects from occurring in the vessel walls (e.g., due to delamination of the fiber layers and losing contact between polymer liner and fiber composite) and to ensure proper hydrogen distribution along the fuel cell stacks (in case of fuel cell vehicles). Additionally, a certain hydrogen pressure in the tank is required to operate the propulsion system (fuel cell and internal combustion engine). This implies that the tanks cannot be fully emptied as a residual amount of hydrogen always needs to be kept inside the tanks to keep the pressure above a certain lower limit. This residual hydrogen amount is then consequently lost for powering the vehicle (amounting to a few percent of residual hydrogen mass, corresponding to a certain driving range of several kilometers and/or a certain time interval for heating/cooling a vehicle cabin, for example). Additionally, some types of hydrogen refueling stations do not release hydrogen, if a certain minimum pressure level cannot be detected at the connected tank, which is meant to be refueled with hydrogen.

In the related art, a semipermeable membrane gas separation system has been reported. Such semipermeable membranes can be utilized for the separation of gaseous mixtures containing components having different rates of diffusion. A gaseous mixture present under elevated pressure may be fed to one side of the membrane, one component of the gaseous mixture then preferentially diffuses through the membrane. The less readily diffusible component on the other hand remains on the barrier side of the membrane.

Moreover, in the related art, a process of the separation of carbon dioxide from gas streams with membranes based on amino-functional polymers has been reported. This approach for selective separation of carbon dioxide is based on the fact that amino groups in polymeric matrices facilitate the transportation of carbon dioxide. The carbon dioxide molecules react reversibly with amino groups to form an unstable carbamate complex, thereby allowing the carbon dioxide to pass from amino group to amino group according to a concentration gradient. This very selective transporting of carbon dioxide can occur additionally to the conventional gas transport. Polymethacrylates and polyacrylates with different amino groups in side chains, polymers based on 4-vinylpyrridin and co-polymers of each with acrylonitrile were synthesized for this purpose. Besides the vinyl-polymers amino-functional polysulfones were investigated, too.

SUMMARY

In preferred aspects, provided are hydrogen tanks with improved volumetric efficiency that can be used up to a point where the respective tank is substantially fully emptied of hydrogen.

In an aspect, the disclosure includes a hydrogen tank a tank vessel configured with an enclosed interior space for storing an admixture of carbon dioxide and gaseous hydrogen; and a tank port configured to fluidly contact the interior space of the tank vessel and including a semipermeable membrane configured substantially permeable for hydrogen and substantially impermeable for carbon dioxide. The semipermeable membrane may be arranged to seal the tank vessel against the outside such that the gaseous hydrogen can enter and leave the tank vessel through the tank port via the semipermeable membrane but the carbon dioxide may be kept in the tank vessel. For example, the carbon dioxide may be kept from leaving the tank vessel through the semipermeable membrane.

The semipermeable membrane may include an amino-functional polymer.

The interior space of the tank vessel may be filled with the admixture including at least partially solid and/or liquid form of the carbon dioxide and the gaseous hydrogen under a first inner pressure in a filled condition of the hydrogen tank such that the carbon dioxide starts to transit into its gaseous phase when the gaseous hydrogen leaves the tank vessel under a working temperature of the hydrogen tank.

The first pressure may be greater than about 100 bar. For example, the first pressure is about 350 bar, or 700 bar.

An amount of the carbon dioxide within the tank vessel is configured such that inner pressure within the tank vessel is greater than a second inner pressure and less than the first inner pressure due to the gas pressure of the carbon dioxide when the tank vessel is substantially free of the gaseous hydrogen in an emptied condition of the hydrogen tank.

The second pressure is less than about 50 bar. For example, the second pressure is between about 10 bar and about 20 bar.

The semipermeable membrane may be arranged:

within a conduit of the tank port, within a charging and/or discharging socket of the tank port, and/or at a flange and/or bottleneck portion of the tank vessel.

Also provided is a vehicle (e.g., hydrogen-powered vehicle) comprises a hydrogen tank according to the invention.

In an aspect, the disclosure provides a method for operating a hydrogen tank as described herein. The method may include: providing an admixture of the carbon dioxide and the gaseous hydrogen within the tank vessel; and discharging and filling the gaseous hydrogen from and into the tank vessel through the semipermeable membrane, thereby varying inner pressure of the tank vessel between a first inner pressure in a filled condition of the hydrogen tank, where the carbon dioxide is at least partially solid and/or liquid, and a second inner pressure in an emptied condition of the hydrogen tank, where the tank vessel is substantially emptied of gaseous hydrogen and the carbon dioxide is at least partially gaseous, the carbon dioxide at least partially transiting into its gaseous phase when gaseous hydrogen leaves the tank vessel under a working temperature of the hydrogen tank.

According to various exemplary embodiments of the disclosure, the carbon dioxide may be used as additional medium inside a hydrogen pressure vessel to keep the pressure inside the vessel at a certain level even if the hydrogen fraction inside becomes increasingly scarce. This is realized by integrating a semipermeable membrane in the tank port that allows the gaseous hydrogen to enter and leave the pressure vessel but keeps the carbon dioxide from escaping the vessel under all conditions. As the hydrogen leaves the vessel, solid and/or liquid carbon dioxide starts to transit into its gaseous phase by evaporation (in case of liquid carbon dioxide) and/or sublimation (in case of solid carbon dioxide) inside the vessel, thereby compensating a potential drop in pressure due to the escaping hydrogen.

Further, according to the various exemplary embodiments, due to the (fully reversible) phase transition of carbon dioxide between solid/liquid and gaseous states, the pressure inside the vessel can be controlled, e.g., the pressure may not drop below undesirable levels. Accordingly, the interior space of the tank vessel may be filled with an admixture of at least partially solid and/or liquid carbon dioxide and the gaseous hydrogen under a first inner pressure in a filled condition of the hydrogen tank such that the carbon dioxide starts to evaporate/sublimate when gaseous hydrogen leaves the tank vessel under a working temperature of the hydrogen tank. Moreover, the amount of carbon dioxide within the tank vessel may be configured such that inner pressure within the tank vessel stays above a second inner pressure less than the first inner pressure due to the gas pressure of the carbon dioxide when the tank vessel is substantially emptied of gaseous hydrogen in an emptied condition of the hydrogen tank.

The disclosure provides a highly mature solution with improved volumetric efficiency due to increased evacuation rate compared to conventional systems, for example, to increase the driving range of motor vehicles with a single tank load as the tank can get completely discharged of hydrogen.

According to an embodiment of the invention, the semipermeable membrane may comprise an amino-functional polymer.

Amino-functional polymers may provide particularly advantageous realizations of a semipermeable membrane able to separate gaseous hydrogen and (gaseous) carbon dioxide. Exemplary membrane materials may include, for example, poly-dimethylaminoethylmethacrylate, poly-dimethylaminoethylacrylate-co-acrylonitrile and poly-4-vinylpyridine. It is to be understood, however, that the person of skill will also readily utilize other materials that are suitable as membrane for separating gaseous hydrogen and gaseous carbon dioxide.

The first pressure may be greater than about 100 bar, for example, about 350 bar or about 700 bar.

There are mainly two filling pressures commonly used around the world for hydrogen powered vehicles, e.g., H70 or 700 bar on the one hand and H35 or 350 bar on the other. The 700 bar standard may be commonly used for passenger vehicles while the other standard is typically used for commercial vehicles. In general, fuel pressure can vary from region to region and country to country.

The second pressure may be less than about 50 bar, for example, between about 10 bar and about 20 bar.

The required minimal residual pressure may vary for different tank systems and manufacturers. For example, the second pressure may amount to about 17 bar or about 20 bar. The amount and composition of carbon dioxide within the tank may be prepared correspondingly.

The semipermeable membrane may be arranged within a conduit of the tank port, within a charging and/or discharging socket of the tank port, and/or at a flange and/or bottleneck portion of the tank vessel.

The membrane may be retrofitted together with the tank port to conventional hydrogen tanks. Alternatively, the membrane may also be manufactured together with the tank vessel, e.g., it may be integrated into the flange and/or bottleneck of the tank vessel. The carbon dioxide may then be filled into the tank vessel only once during manufacturing of the hydrogen tank any may then be used during the whole lifetime of the tank. When for any reason the hydrogen tank needs to be opened (for inspection purposes or others), the carbon dioxide first needs to be refilled according to a working instruction before closing the tank again.

The carbon dioxide may be introduced in the interior space of the tank vessel in solid form, e.g., dry ice, before the interior space is closed off by the semipermeable membrane.

For example, dry ice may be brought into the interior space during the manufacturing process of the hydrogen tank. In a second step, the membrane may be implemented at the flange of the tank vessel, for example. The carbon dioxide load may thus be used for the whole lifetime of the hydrogen tank.

Other aspects of the invention are disclosed infra.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

Figure 1:
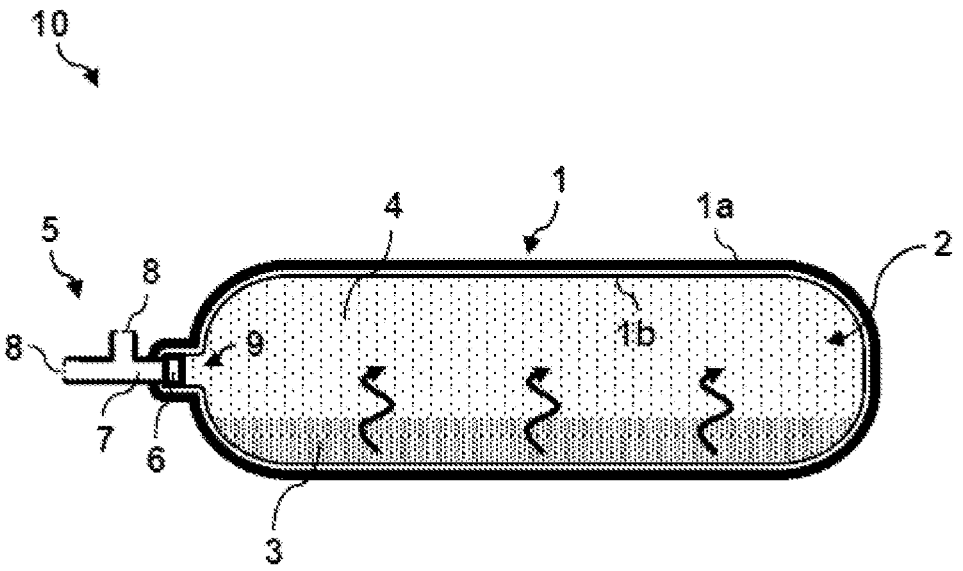
FIG. 1 shows a hydrogen tank according to an exemplary embodiment of the invention.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION

Above objectives, other objectives, features, and advantages will be readily understood from the following preferred embodiments associated with the accompanying drawings. However, the embodiments described herein may be embodied in other forms. The embodiments described herein are provided so that the invention can be made thorough and complete and that the spirit of the present invention can be fully conveyed to those skilled in the art.

Throughout the drawings, like elements are denoted by like reference numerals. In the accompanying drawings, the dimensions of the structures are larger than actual sizes for clarity of the present invention. Terms used in the specification, "first", "second", etc., may be used to describe various components, but the components are not to be construed as being limited to the terms. These terms are used only for the purpose of distinguishing a component from another component. For example, a first component may be referred as a second component, and the second component may be also referred to as the first component. As used herein, the singular forms "a", "an", and "the" are intended to include the plural forms as well unless the context clearly indicates otherwise.

It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof. It will also be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In this specification, where a range of a variable is described, it will be understood that the variable includes all values within the stated range, including the stated endpoints of the range. For example, a range of 5 to 10 includes: integer values such as 5, 6, 7, 8, 9, and 10; any subranges such as 6 to 10, 7 to 10, 6 to 9, 7 to 9, and the like; and any values between integers such as 5.5, 6.5, 7.5, 5.5 to 8.5 and 6.5 to 9, and the like. For example, a range of 10% to 30% includes: any integer percentages such as 10%, 11%, 12%, 13%, and the like, inclusive of 30%; any sub ranges such as 10% to 15%, 12% to 18%, 20% to 30%, and the like; and any non-integer percentages between integer percentages such as 10.5%, 15.5%, 25.5%, and the like.

FIG. 1 shows an exemplary hydrogen tank 10 according to an exemplary embodiment of the invention.

Figure 4:
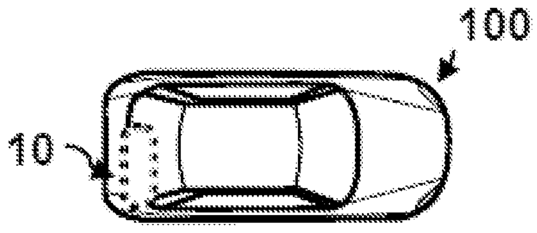
FIG. 4 shows an exemplary motor vehicle equipped with the hydrogen tank of FIG. 1 according to an exemplary embodiment of the invention.

The tank 10 is used for delivering a vehicle with compressed gaseous hydrogen 4, e.g., a motor vehicle 100 as exemplarily shown in FIG. 4. The hydrogen 4 may be used to feed an internal combustion engine of the vehicle 100 (hydrogen internal combustion engine vehicle, HICEV). Alternatively, the vehicle 100 may be a fuel cell electric vehicle (FCEV) and the hydrogen 4 may be used to feed fuel cells of the vehicle 100 to generate electric power for an electric motor by converting $H_2$ with $O_2$ from the environment to $H_2O$. The hydrogen tank 10 may be configured to deliver the hydrogen 4 at a certain nominal working pressure, e.g., at about 700 bar. With either method, the only byproduct from the spent hydrogen is water, and the process is entirely free of $CO_2$ emissions, which is one reason why hydrogen is a particularly attractive alternative fuel.

The hydrogen tank 10 includes a tank vessel 1 configured with an enclosed interior space 2 for storing an admixture of carbon dioxide 3 and (compressed) gaseous hydrogen 4. The vessel 1 itself may be configured similarly to conventional hydrogen pressure tanks normally used for the present purpose. Thus, the tank vessel 1 may include a high-density polymer liner **1*b* that serves as a diffusion barrier for the gaseous hydrogen 4 to prevent leakage of the hydrogen 4 through the vessel walls. The polymer liner 1***b* may then be encompassed by a fiber composite mantle 1*a*, e.g., made of carbon fiber reinforced plastic, reinforcing the vessel structure against the inner pressure P of the hydrogen 4 and generally serving as structural support for the tank 10. The tank vessel 1 may include further features as they are known from conventional systems, which are not shown here for simplicity, e.g., a dome protector on both axial ends etc.

In conventional hydrogen tanks, the inner pressure P would have to be kept above a certain minimal pressure value, e.g., about 10-20 bar, in order to avoid delamination and other structural defects within the composite material and to maximize the lifetime of the tank. This usually would have the drawback that the hydrogen 4 stored within such a tank could not be used in its entirety. A small percentage would have to remain within the tank at any point in time to guarantee that the pressure cannot drop below this minimal level. The disclosure is provided to overcome these drawbacks as will be explained now with reference to the figures.

The hydrogen tank 10 is not only filled with gaseous hydrogen 4 but in addition contains a certain amount of carbon dioxide 3. The carbon dioxide 3 may be filled into the tank 10 during production only once, e.g., in solid form as dry ice, and may then remain there for the whole lifetime of the tank 10. During operation the solid carbon dioxide may later at least partially transit into its liquid state depending on the working temperature of the hydrogen tank 10 and/or into its gaseous state. In principle, it would also be possible to fill in the carbon dioxide 3 directly in liquid form or in mixture of solid and liquid (and potentially also gaseous) phase states.

The interior space 2 of the tank vessel 1 is filled with an admixture of at least partially solid and/or liquid carbon dioxide 3 and gaseous hydrogen 4 under a first inner pressure in a filled condition of the hydrogen tank 10. $H_2$ and $CO_2$ are two independent molecules and $CO_2$ itself is an inert gas. For example, both molecule can co-exist in the same volume without any interaction despite sharing the same temperature and pressure (law of partial pressure by Dalton). As a consequence, to use the full potential of the solution, the entire interior space 2 of the tank vessel 1 may be completely filled with both materials.

In order to keep the carbon dioxide 3 inside the tank 10, the tank 10 further includes a tank port 5 to fluidly contact the interior space 2 of the tank vessel 1. The tank port 5 includes a semipermeable membrane 6 configured substantially permeable for hydrogen 4 and substantially impermeable for carbon dioxide 3. Particularly, the semipermeable membrane 6 is arranged to seal the tank vessel 1 against the outside such that (gaseous) hydrogen 4 can enter and leave the tank vessel 1 through the tank port 5 via the semipermeable membrane 6 but (in particular gaseous) carbon dioxide 3 is kept from leaving the tank vessel 1 through the semipermeable membrane 6. In other words, the membrane 6 functions as a kind of filter to separate the carbon dioxide 3 from the gas stream leaving the tank vessel 1.

Such a membrane 6 may include, for example, on basis of amino-functional polymers. Exemplary materials comprise dimethylaminoethylmethacrylate, poly-dimethylaminoethylacrylate-co-acrylonitrile and poly-4-vinylpyridine.

There are various ways to integrate such a semipermeable membrane 6 in the tank port 5. In the exemplary embodiment of FIG. 1, the membrane 6 is provided at a flange and/or bottleneck portion 9 of the tank vessel 1. In this case, it may already get integrated during manufacturing of the tank 10. However, in other embodiments, the membrane 6 may also be provided within a conduit 7 of the tank port 5 and/or within a charging and/or discharging socket 8 of the tank port 5. The membrane 6 together with the tank port 5 may in principle be retrofitted to conventional tank vessels, which would provide a very cost-effective and simple solution. The integration of the membrane 6 at the flange and/or bottleneck portion 9 of the tank vessel 1 may be particularly advantageous with regards to potential icing effects, which could potentially occur in other embodiments under extreme temperatures close to the inlets/outlets of the tank 10 and/or inside small conduits.

As soon as hydrogen 4 is discharged from the interior space 2 during operation of the tank 10, the carbon dioxide 3 starts to transit into its gaseous phase by evaporation and/or sublimation due to the corresponding pressure drop (depending on its specific current state and the current pressure and temperature within the interior space 2, as shown with arrows in FIG. 1). The gas pressure of the carbon dioxide 3 then stabilizes pressure inside the tank vessel 1 such that inner pressure within the tank vessel 1 stays above a second inner pressure smaller than the first inner pressure even when the tank vessel 1 is substantially emptied of gaseous hydrogen 4 in an emptied condition of the hydrogen tank 10.

Figure 2:
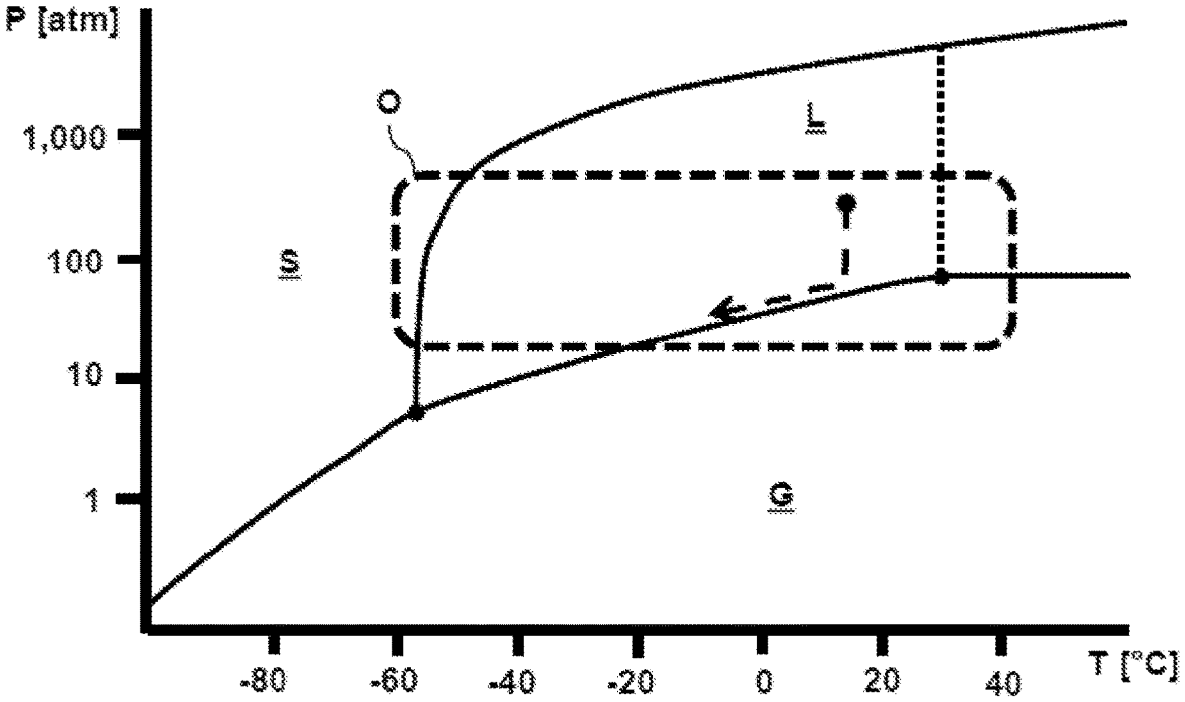
FIG. 2 shows an exemplary operating window for the hydrogen tank of FIG. 1 in a phase diagram of carbon dioxide according to an exemplary embodiment of the invention.

The gaseous carbon dioxide 3 will transit back to its solid/liquid state as soon as the hydrogen 4 is refilled into the tank 10 since the pressure P will rise back above the respective threshold in the phase diagram (FIG. 2). The $CO_2$ is not consumed during the process due to the sealing property of the membrane 6. Hence, a single carbon dioxide 3 filling can in principle be used over the whole lifetime of the hydrogen tank 10.

FIG. 2 shows an exemplary operating window O for the hydrogen tank 10 of FIG. 1 in a phase diagram of carbon dioxide 3. The dashed arrow in the middle of the figure exemplifies the typical behavior of the system. As soon as hydrogen 4 is consumed by the vehicle systems, the hydrogen 4 filling level drops within the interior space 2 of the tank 10. Due to the corresponding drop in inner pressure P, the $CO_2$ starts to evaporate. Thus, the related pressure decrease is limited. The amount of carbon dioxide 3 within the tank 10 may be configured specifically to guarantee that the inner pressure P does not drop below a certain minimal level, e.g., 15 to 20 bar, even when the tank 10 is completely discharged of hydrogen 4, due to the gas pressure of the evaporated carbon dioxide 3.

Figure 3:
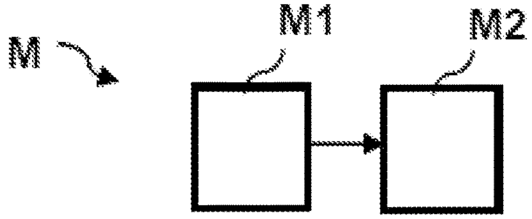
FIG. 3 shows an exemplary method for operating the hydrogen tank of FIG. 1 according to an exemplary embodiment of the invention.

FIG. 3 shows an exemplary method M for operating such a hydrogen tank 10, which comprises under M1 providing an admixture of the carbon dioxide 3 and the gaseous hydrogen 4 within the tank vessel 1 and under M2 discharging and filling the gaseous hydrogen 4 from and into the tank vessel 1 through the semipermeable membrane 6, thereby varying inner pressure of the tank vessel 1 between the first inner pressure in a filled condition of the hydrogen tank 10, where the carbon dioxide 3 is at least partially solid and/or liquid, and the second inner pressure in an emptied condition of the hydrogen tank 10, where the tank vessel 1 is substantially emptied of gaseous hydrogen 4 and the carbon dioxide 3 is at least partially gaseous.

Based on a phase transition of carbon dioxide from liquid/solid into gaseous state, an automatic adaption of volume and/or pressure may be performed within the tank vessel 1 when the hydrogen 4 filling level drops (such a phase transition can provide a volume change by a factor of roughly 550). The solution may be simply realized by filling in dry ice into the tank 10, e.g., during production, and implement a membrane impermeable for gaseous carbon dioxide.

As shown in FIG. 2, the carbon dioxide 3 may also enter its supercritical state under very high temperatures. This, however, should not affect the underlying principles of the present approach, as the supercritical $CO_2$ will still perform the required phase transition when the hydrogen part is evacuated from the tank vessel 1.

In the foregoing detailed description, various features are grouped together in one or more examples with the purpose of streamlining the disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The embodiments were chosen and described in order to explain the principles of the invention and its practical applications, to thereby enable others skilled in the art to utilize the invention and various embodiments with various modifications as are suited to the particular use contemplated.

REFERENCE LIST

1 tank vessel
1*a* fiber composite mantle
1*b* polymer liner
2 interior space
3 carbon dioxide
4 hydrogen
5 tank port
6 semipermeable membrane
7 conduit
8 socket
9 flange and/or bottleneck portion
10 hydrogen tank
100 motor vehicle
P pressure
S solid state
L liquid state
G gaseous state
T temperature
O operation window
M method
M1, M2 method steps

What is claimed:

1. A hydrogen tank, comprising:
a tank vessel configured with an enclosed interior space for storing an admixture of carbon dioxide and gaseous hydrogen; and
a tank port configured to fluidly contact the interior space of the tank vessel, the tank port comprising a semipermeable membrane configured permeable for the gaseous hydrogen and impermeable for the carbon dioxide, the semipermeable membrane being arranged to seal the tank vessel against the outside such that the gaseous hydrogen can enter and leave the tank vessel through the tank port via the semipermeable membrane but the carbon dioxide is kept in the tank vessel;
wherein the interior space of the tank vessel is filled with the admixture including at least partially solid and/or liquid form of the carbon dioxide and the gaseous hydrogen under a first inner pressure in a filled condition of the hydrogen tank such that the carbon dioxide starts to transit into its gaseous phase when the gaseous hydrogen leaves the tank vessel under a working temperature of the hydrogen tank.

2. The hydrogen tank according to claim 1, wherein the semipermeable membrane comprises an amino-functional polymer.

3. The hydrogen tank according to claim 1, wherein the first pressure is greater than 100 bar.

4. The hydrogen tank according to claim 3, wherein the first pressure is about 350 bar, or 700 bar.

5. The hydrogen tank according to claim 1, wherein an amount of the carbon dioxide within the tank vessel is configured such that inner pressure within the tank vessel is greater than a second inner pressure and less than the first inner pressure due to the gas pressure of the carbon dioxide when the tank vessel is free of the gaseous hydrogen in an emptied condition of the hydrogen tank.

6. The hydrogen tank according to claim 5, wherein the second pressure is less than 50 bar.

7. The hydrogen tank according to claim 6, wherein the second pressure is between about 10 bar and about 20 bar.

8. The hydrogen tank according to claim 1, wherein the semipermeable membrane is arranged:
within a conduit of the tank port,
within a charging and/or discharging socket of the tank port, and/or
at a flange and/or bottleneck portion of the tank vessel.

9. A vehicle comprising a hydrogen tank of claim 1.

10. A method of operating a hydrogen tank according to claim 1, the method comprising:
providing the admixture of the carbon dioxide and the gaseous hydrogen within the tank vessel; and
discharging and filling the gaseous hydrogen from and into the tank vessel through the semipermeable membrane, thereby varying inner pressure of the tank vessel between a first inner pressure in a filled condition of the hydrogen tank, where the carbon dioxide is at least partially solid and/or liquid, and a second inner pressure in an emptied condition of the hydrogen tank, where the tank vessel is emptied of gaseous hydrogen and the carbon dioxide is at least partially gaseous, the carbon dioxide at least partially transiting into its gaseous phase when gaseous hydrogen leaves the tank vessel under a working temperature of the hydrogen tank.

11. The method according to claim 10, wherein the first pressure is greater than 100 bar.

12. The method according to claim 11, wherein the first pressure is about 350 bar, or about 700 bar.

13. The method according to claim 10, wherein the second pressure is less than 50 bar.

14. The method according to claim 13, wherein the second pressure is between about 10 bar and about 20 bar.

15. The method according to claim 10, wherein the carbon dioxide is introduced in the interior space of the tank vessel in a solid form before the interior space is closed off by the semipermeable membrane.

* * * * *